United States Patent [19]
Klusmann et al.

[11] 3,889,173
[45] June 10, 1975

[54] SWITCHING REGULATOR POWER SUPPLY

[75] Inventors: Donald L. Klusmann, Plano; Jin Y. Soh, Dallas; Roger B. Whitaker, Garland, all of Tex.

[73] Assignee: Texas Instruments Incorporated, Dallas, Tex.

[22] Filed: Dec. 7, 1973

[21] Appl. No.: 422,626

[52] U.S. Cl. ............... 321/2; 323/17; 323/DIG. 1; 331/112
[51] Int. Cl. ............................................ H02m 7/20
[58] Field of Search.......... 321/2, 18; 323/17, 22 T, 323/DIG. 1; 331/112

[56] References Cited
UNITED STATES PATENTS

| | | |
|---|---|---|
| 3,515,974 | 6/1970 | Stich ........................................ 321/2 |
| 3,569,779 | 3/1971 | Luursema ............................ 321/2 X |
| 3,569,818 | 3/1971 | Dahlinger et al. ....................... 321/2 |
| 3,602,801 | 8/1971 | Williamson ............................ 323/17 |
| 3,639,826 | 2/1972 | Grundberg.............................. 321/2 |

*Primary Examiner*—A. D. Pellinen
*Attorney, Agent, or Firm*—Harold Levine; Edward J. Connors, Jr.; John G. Graham

[57] ABSTRACT

A rectifier input switching regulator, which includes a blocking oscillator with feedback to control duty cycle, provides a versatile and efficient power supply operable with DC, 400 cycle, 60 cycle and 50 cycle per second power lines of line voltages between about 100 and 250 volts to provide a set of uniform DC output voltages. This power supply is particularly useful for desk-top calculators or other small electrical appliances. Use of this supply circuit allowed one unit to be manufactured for worldwide sales since all possible standard supply voltages are covered. The blocking oscillator is connected to the rectifier and supplies a transformer to store output energy from the oscillator. A capacitor connected to a secondary winding of the transformer is charged to a desired output voltage. A feedback circuit is connected to turn the oscillator on and off to maintain the output voltage at a predetermined level.

3 Claims, 1 Drawing Figure

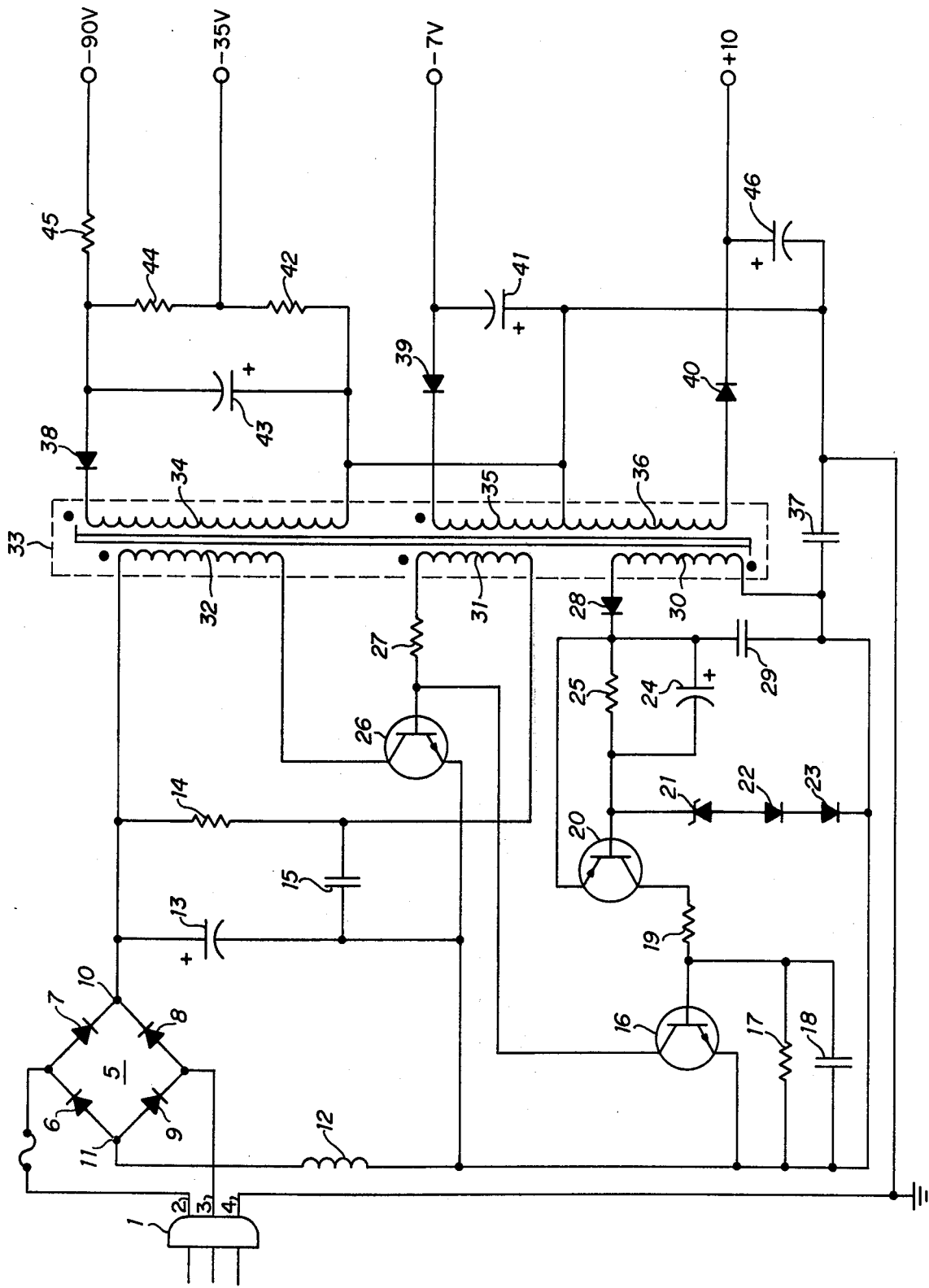

SWITCHING REGULATOR POWER SUPPLY

FIELD OF INVENTION

This invention relates to a universal power supply employing a blocking oscillator with feedback to control the duty cycle in dependence upon the input voltage.

DESCRIPTION OF THE PRIOR ART

Conventional regulated power supplies have used a series-pass element which operates as a variable resistance to drop an unregulated input voltage down to a fixed output voltage. This element, usually a transistor and reference diode, must be able to dissipate power equal to the voltage difference between the input and output multiplied by the load current.

A switching regulator, however, is capable of high efficiency operation even with large differences between the input and output voltages.

SUMMARY OF THE INVENTION

The present invention provides a power supply circuit which may be used with a plurality of power lines varying in frequency and voltage amplitudes.

Efficient regulation of the output voltage is provided by storing the input energy for future use, rather than dissipating the input energy to acquire the desired output voltage.

In accordance with this invention, there is provided a versatile and efficient power supply circuit adapted for use with DC, 400 cycle per second, or 50 or 60 cycle per second power line frequencies, and with an input voltage range of from about 100 to about 250 volts.

A full-wave bridge rectifier in the input and a switching regulator comprising a blocking oscillator with feedback provide the desired versatility and efficiency.

The total output power level is determined by the total energy stored in the primary winding of a transformer during the turn-on period of the blocking oscillator. When the blocking oscillator is in its turn-off period, energy stored in the magnetic field of the transformer core is delivered to the load circuit. Excess current which is not required by the load circuits is used to change output capacitors, which discharge when load requirements exceed the current supplied by secondary coils of the transformer. Thus, the switching regulator accents the storage and ultimate use of input energy, rather than dissipation of the energy, to acquire desired output voltages.

More particularly, a power supply is regulated to accept inputs of various frequencies and magnitudes and to provide an output voltage of preset level, rectifying the input voltage to provide an operating voltage. Pulsed oscillations are generated from the operating voltage to store input energy in a magnetic field. The magnetic field is collapsed to store the energy as an electrostatic charge at a desired output voltage level. The repetition rate of the pulsed oscillations is varied in dependence upon said output voltage level to control the periods during which the electrostatic charges are accumulated.

In a further aspect there is provided a full-wave rectifier to produce DC output voltages from input voltages of various frequencies and magnitudes. A blocking oscillator connected to the rectifier supplies a transformer to store output energy from the oscillator. A capacitor connected to a secondary winding of the transformer is charged to a desired output voltage. A feedback means is connected to turn the oscillator on and off to maintain the output voltages at a predetermined level.

DESCRIPTION OF THE DRAWING

For a more complete understanding of the invention and for further objects and advantages thereof, reference may now be had to the following description taken in conjunction with the accompanying drawing in which:

The FIGURE is a schematic diagram of the switching regulator power supply circuit.

DESCRIPTION OF THE PREFERRED EMBODIMENT

An embodiment of the present invention will be described in connection with the FIGURE wherein the input voltages of DC, 50 cycle, 60 cycle or 400 cycle frequencies at levels of from about 100 to 250 volts are employed to produce a set of output voltages which are suitable for operation of various integrated circuit systems. Many such systems require voltages of −90, −35, −7 and +10 volts for system operation. The embodiment here described provides such DC supply voltages at a regulated level for any of the various possible levels and frequencies of the input source.

In this system, an input fixture 1 has a ground terminal 4 and input terminals 2 and 3. Terminal 2 is connected through a fuse to one terminal of a bridge rectifier 5 having diodes 6–9. Node 11 of bridge 5 is connected by way of inductor 12 and capacitor 13 to node 10. Node 10 is also connected to the upper terminal of a winding 32 forming part of a toroidal transformer 33. The lower terminal of winding 32 is connected to the collector of transistor 26, the emitter of which is connected to the juncture between inductor 12 and capacitor 13. The base of transistor 26 is connected by way of resistor 27 to the upper terminal of a winding 31 of transformer 33. The lower terminal of winding 31 is connected through resistor 14 to terminal 10. Capacitor 15 is connected between the emitter of transistor 26 and the lower terminal of winding 31. The base of transistor 26 is also connected to the collector of a transistor 16, the emitter of which is connected to the emitter of transistor 26. The base of transistor 16 is connected to its emitter by way of a parallel RC circuit comprising resistor 17 and capacitor 18. The base of transistor 16 is connected by way of resistor 19 to the collector of a transistor 20. The emitter of transistor 20 is connected by way of a diode 28 to the upper terminal of a transformer winding 30, and by way of parallel capacitor-resistor circuit 24, 25 to the base of transistor 20. A Zener diode 21 and a pair of diodes 22 and 23 are connected in series between the base of transistor 20 and the emitter of transistor 16. The emitter of transistor 16 is connected to the lower terminal of winding 30, and by way of capacitor 29 to the emitter of transistor 20.

A secondary winding 34 is connected by way of diode 38 and a resistor 45 to a −90 volt output terminal. A capacitor 43 is connected across winding 34 in parallel with a voltage dividing network comprising resistors 42 and 44. The juncture between resistors 42 and 44 is connected to a −35 volt output terminal.

The lower terminal of winding 34 is connected to a tap on a winding comprising sections 35 and 36. The upper terminal of winding 35 is connected by way of a rectifier 39 to the −7 volt output terminal. A capacitor 41 is connected across the upper winding 35. A lower terminal of winding 36 is connected by way of a rectifier 40 to the +10 volt output terminal. The mid tap between windings 35 and 36 is connected to the ground terminal 4, and by way of capacitor 37 to the lower terminal of winding 30. A capacitor 46 is connected across winding 36.

In operation, power line inputs are fed directly to full-wave bridge rectifier 5. Any AC input voltage is rectified to maintain node 10 positive with respect to node 11. DC input voltages are properly polarized by full wave rectifier 5 to maintain node 10 positive. A blocking oscillator is comprised of transistor 26 and primary coils 31 and 32. In the turn-on condition, the base-emitter junction of transistor 26 carries a substantial forward current, causing that transistor to saturate. The collector to emitter voltage at saturation equals approximately zero. Thus, almost all of the input voltage will appear across the primary coil 32 of transformer 33, and the current rises until the base current is no longer sufficient to allow adequate collector current to flow to maintain the voltage across coil 32. While the current in the primary coil 32 is rising, the forward bias of the base-emitter junction of transistor 26 is reinforced by a voltage induced in coil 31. When the current in primary coil 32 is limited by transistor 26 and is no longer increasing, current is no longer induced into coil 31. This reduces the base drive to transistor 26, thereby reducing current in primary coil 32. This results in a reverse voltage across coil 31 as the inductor tries to maintain current flow. This action turns transistor 26 off, and blocks the current path through primary coil 32.

During the charge cycle when transistor 26 is in a turn-on period, diodes 38, 39, 40 and 28 are reverse biased. Thus, very little energy can build up in coils 34, 35, 36, and 30. As transistor 26 approaches its turn-off period and the current in coil 32 decreases, the current induced in the secondary coils 34, 35 and 36 forward biases diodes 38, 39 and 40. Also, the current induced in winding 30 forward biases diode 28. Currents in windings 34, 35, 36 and 30 increase rapidly to allow energy to build up which goes to the loads and to recharge capacitors 43, 41, 46 and 29. These capacitors will continue to charge as long as the coils can supply a current greater than that required by their respective loads. When the coil currents become less than that which the loads require, the output capacitors begin to supply a share of the load current and discharge.

The feedback circuit comprising transistor 20 and transistor 16 controls the duty cycle of the switching transistor 26, and thus controls the output voltage to the load. The reference voltage of the feedback circuit is set by the sum of the drops across Zener diode 21, diode 22, diode 23 and the base-emitter voltage of transistor 20. When the power or voltage transferred to winding 30 exceeds the reference voltage, transistor 20 is turned on and current is charged to capacitor 18 through resistor 19. Thus, transistor 20 is forward biased when capacitor 18 is charged. The collector current of transistor 20 drives the base of transistor 16, thus turning transistor 16 on and shorting the base of transistor 26 to ground.

If instead of an excess of energy, the load requirements exceed the secondary coil current supply, the corresponding load capacitors discharge. When capacitors 43, 41 or 46 discharge, capacitor 29 likewise discharges. As the voltage across capacitor 29 equals the feedback reference voltage, the sum of the drops across diodes 21, 22 and 23 plus the base-emitter voltage of transistor 20, the base-emitter voltage across transistor 20 will drop when capacitor 29 discharges. This in turn decreases the collector current of transistor 20 which drives the base of transistor 16. As this action is cummulative, transistor 16 will be turned off.

Just before turn-off, transistor 16 is holding transistor 26 off. When transistor 16 turns off, the base of transistor 26 is no longer grounded, and the current through primary coil 31 then drives transistor 26. The collector-emitter voltage across transistor 26 drops, and a small forward voltage is thereby again induced in coil 31 to reinforce the forward bias of the base-emitter junction of transistor 26. Thus, the switching transistor rapidly moves into its turn-on condition and the system moves from a discharge cycle into another charge cycle.

The −7 volt, −35 volt, and −90 volt outputs are a function of their respective loads, the turn ratios between secondary coils 34, 35, 36 and 30, the output capacitors 43 and 41, and the +10 volt output regulation. The additional outputs illustrate a possible extension of the present embodiment and are not necessary to illustrate the invention itself.

Capacitor 13 is a filter capacitor for the bridge rectifier, while capacitor 15 provides an AC ground at the oscillating frequency.

Resistor 14 supplies current to the base of transistor 26 through coil 31 and resistor 27 to start the first cycle when power is initially applied.

Inductor 12, and capacitors 37 and 24 serve to reduce interference and the effect of ripple.

Table 1 itemizes the critical components of the invention. As an illustration and not a limitation, the designations and electrical parameters are included.

TABLE 1

| ITEM | DESIGNATION | DESCRIPTION |
|---|---|---|
| 6 | Power Diode | IN4004 |
| 7 | Power Diode | IN4004 |
| 8 | Power Diode | IN4004 |
| 9 | Power Diode | IN4004 |
| 12 | Inductor | 1mH. $R_{DC}$ = 19ohm Imax = 160ma |
| 13 | Electrolytic Capacitor | 20µfd. 200v. |
| 14 | Resistor | 470Kohm, ¼ watt, carbon |
| 15 | Ceramic Capacitor | .1µfd. 25v. |
| 16 | Signal Transistor | 2N5449, TIS92 |
| 17 | Resistor | 1.3Kohm, ¼ watt, carbon |
| 18 | Ceramic Capacitor | .002µfd., 250 v. |
| 19 | Resistor | 750ohm, ¼watt, carbon |
| 20 | Signal Transistor | 2N5447, TI593 |
| 21 | Zener Diode | IN756A |
| 22 | Diode | IN4148 |
| 23 | Diode | IN4148 |
| 24 | Electrolytic Capacitor | 10µfd., 25v. |
| 25 | Resistor | 300ohm, ¼ watt, carbon |
| 26 | Power Transistor | TIP48 |
| 27 | Resistor | 270ohm, ¼ watt, carbon |
| 28 | Power Diode | G2202, IN4001 |
| 29 | Ceramic Capacitor | .1µfd., 25v. |
| 30 | Coil | 28.4µH, .102 turns ratio, $R_{DC}{}^{III}{}_{max}$ = .20ohm |
| 31 | Coil | 6.2µH, .0459 turns ratio, $R_{DC}{}^{III}{}_{max}$ = .20ohm |
| 32 | Coil | 3.12mH, 1.0 turns ratio, $R_{DC}{}^{III}{}_{max}$ = 1.7ohm |
| 33 | Toroidal | Dielectric Breakdown Voltage |

TABLE 1-Continued

| ITEM | DESIGNATION | DESCRIPTION |
|---|---|---|
|  | Transformer | between Windings = 900 VAC for one minute |
| 34 | Coil | 2.28mH, .867 turns ratio, $R_{DC}^{IIII}{}_{(max)} = 1.7$ohm |
| 35 | Coil | 14.8μH, .0663 turns ratio, $R_{DC}^{IIII}{}_{(max)} = .27$ohm |
| 36 | Coil | 36.9μH, .0969 turns ratio, $R_{DC}^{IIII}{}_{(max)} = .29$ohm |
| 37 | Ceramic Capacitor | .01μfd., 1kv. |
| 38 | Power Diode | G2204, IN4004 |
| 39 | Power Diode | G2202, IN4001 |
| 40 | Power Diode | G2202, IN4001 |
| 41 | Electrolytic Capacitor | 100μfd., 25v. |
| 42 | Resistor | 68Kohm, ¼ watt, carbon |
| 43 | Electrolytic Capacitor | 10μfd., 160v. |
| 44 | Resistor | 68Kohm, ¼watt, carbon |
| 45 | Resistor | 270ohm, ¼watt, carbon |
| 46 | Electrolytic Capacitor | 100μfd., 25v. |

Having described the invention in connection with certain specific embodiments thereof, it is to be understood that further modifications may now suggest themselves to those skilled in the art and it is intended to cover such modifications as fall within the scope of the appended claims.

What is claimed is:

1. A regulated power supply circuit of varied input and constant output capability which comprises:
  a. a full-wave rectifier to produce DC output voltages from input voltages of varied magnitude and frequency;
  b. a blocking oscillator containing an oscillating transistor connected to said rectifier;
  c. a toroidal transformer connected to said oscillator to store output energy from said oscillator;
  d. a rectifier and a capacitor connected to a secondary winding of said transformer to charge said capacitor in dependence upon the turns of secondary winding and the repetition rate of said oscillator to provide an output voltage across said capacitor;
  e. feedback means including first and second signal transistors coupled to a winding of said transformer for turning said oscillator on and off to maintain said output voltage at a predetermined level;
  said feedback means further includes:
  f. a first diode whose anode is connected in series to the top terminal of said winding and whose cathode is connected to the emitter of said first signal transistor;
  g. a first resistor connected to the base of said first signal transistor and to the cathode of said first diode;
  h. a first capacitor connected in parallel with said resistor;
  i. a second capacitor whose first terminal is connected to the emitter of said first signal transistor and which is connected in parallel to the serial circuit of said first diode and said winding;
  j. a Zener diode whose cathode is connected to the base of said first signal transistor;
  k. a second diode whose anode is connected to the anode of said Zener diode;
  l. a third diode whose anode is connected to the cathode of said second diode and whose cathode is connected to the emitter of said second signal transistor, to the second terminal of said second capacitor, and to the bottom terminal of said winding;
  m. a second resistor connected to the collector of said first signal transistor, and to the base of said second signal transistor;
  n. a third resistor connected to the base and the emitter of said second signal transistor;
  o. a third capacitor connected in parallel to said third resistor, and across the base-emitter junction of said second signal transistor;
  p. and a common connection of the collector of said second signal transistor with the base of the oscillating transistor of said blocking oscillator.

2. The combination set forth in claim 1 wherein a plurality of secondary windings on said transformer and a plurality of rectifier-capacitor combinations provide a plurality of output voltages.

3. In a regulated power supply adapted to accept inputs from power lines of various frequencies and voltage amplitudes, and to provide a constant output voltage level, the combination which comprises:
  a. a full-wave bridge rectifier to produce DC output voltages from input voltages of varied magnitude and frequency;
  b. a transformer which stores input energy from said rectifier with one of a plurality of secondary windings connected to deliver energy to an output load;
  c. a blocking oscillator, connected at its collector current path to a transformer primary winding and in its control current path with one of said secondary windings, to control the storage of input energy in said transformer for depletion through said one of said secondary windings to said load;
  d. a rectifier-output capacitor combination coupled to said one of said secondary windings to provide an output voltage across said load;
  e. a two signal transistor feedback means coupled to a secondary winding of said transformer and connected to the control path of said blocking oscillator to control the conduction periods of said oscillator and maintain said output voltages at predetermined levels;
  f. said blocking oscillator including a power transistor whose collector is connected through a primary coil of said transformer to the positive output node of said full-wave rectifier, whose emitter is connected to the emitter of the output signal transistor of said feedback means and inductively coupled to the negative output node of said rectifier, and whose base is resistively coupled through a winding of said transformer to the positive output node of said rectifier and connected to the collector of the output signal transistor of said feedback means;
  g. said feedback means including a series circuit of a diode connected to a terminal of a feedback winding of said transformer of instantaneous polarity opposite the polarity of said one of said secondary windings, with the cathode of said diode connected to the emitter of an input signal transistor, and the second terminal of said feedback winding is connected to the emitter of an output signal transistor whose base is resistively coupled to the collector of said input signal transistor;
  h. a reference voltage circuit including a Zener diode cathode connected to the base of said input signal transistor and anode coupled to the emitter of said output signal transistor;

i. a capacitor, with one terminal connected to the emitter of said input signal transistor of said feedback means and the other terminal connected to the emitter of said output signal transistor, to serve as a feedback reference voltage source equal to the voltage across the emitter-base junction of said input signal transistor plus the voltage across said reference voltage circuit; and j. means to couple said rectifier-output capacitor combination to said transformer for reverse bias of the rectifier therein when said blocking oscillator is in a charge cycle, and to charge the output capacitor when said blocking oscillator is not in a charge cycle.

* * * * *